United States Patent
Wilhelm et al.

(10) Patent No.: US 8,228,229 B2
(45) Date of Patent: Jul. 24, 2012

(54) SPACE NAVIGATION RECEIVER OPERATING WITH THE ASSISTANCE OF NAVIGATION INFORMATION

(75) Inventors: Nicolas Wilhelm, Tournefeuille (FR); Michel Monnerat, Saint-Jean (FR); Henri Favaro, Sainte Foy d'Aigrefeuille (FR)

(73) Assignee: Alcatel Lucent, Paris (FR)

( * ) Notice: Subject to any disclaimer, the term of this patent is extended or adjusted under 35 U.S.C. 154(b) by 325 days.

(21) Appl. No.: 12/375,624

(22) PCT Filed: Jul. 10, 2007

(86) PCT No.: PCT/EP2007/057028
§ 371 (c)(1),
(2), (4) Date: Nov. 16, 2009

(87) PCT Pub. No.: WO2008/015080
PCT Pub. Date: Feb. 7, 2008

(65) Prior Publication Data
US 2010/0073223 A1  Mar. 25, 2010

(30) Foreign Application Priority Data
Jul. 31, 2006 (FR) ...................................... 06 53224

(51) Int. Cl.
*G01S 19/25* (2010.01)
(52) U.S. Cl. ................................................. 342/357.64
(58) Field of Classification Search ............... 342/357.64
See application file for complete search history.

(56) References Cited

U.S. PATENT DOCUMENTS

| | | | |
|---|---|---|---|
| 2002/0084933 A1 | 7/2002 | Krasner | |
| 2003/0011511 A1* | 1/2003 | King et al. | 342/357.02 |
| 2003/0072356 A1 | 4/2003 | Abraham et al. | |
| 2003/0219082 A1* | 11/2003 | Tanaka et al. | 375/324 |
| 2004/0004570 A1* | 1/2004 | Townsend et al. | 342/384 |

FOREIGN PATENT DOCUMENTS

| | | |
|---|---|---|
| OA | 9 803 A | 4/2004 |
| WO | WO 02/059639 A | 8/2002 |

OTHER PUBLICATIONS

Stephane Lannelongue et al., "Fast Acquisition Techniques for G.P.S. Receivers," Institute of Navigation—AM 98, pp. 261-269, XP002420150, 1998.
International Search Report.

* cited by examiner

*Primary Examiner* — Harry Liu
(74) *Attorney, Agent, or Firm* — Fay Sharpe LLP

(57) ABSTRACT

A space navigation receiver (NR) comprises i) a radiofrequency processing module (PM1) tasked both with converting radio navigation signals transmitted by a satellite navigation system into digital navigation signals, and with converting auxiliary radio signals representative of navigation information about said system into auxiliary digital signals, ii) a digital processing module (PM2) tasked with periodically acquiring the digital navigation signals by sub-sampling the received radio signal, then processing the acquired signal samples (resulting from this sub-sampling) in order to produce raw measurements from these samples, from auxiliary digital signals, and from location points, and iii) a location module (LM) tasked with determining location points based on raw measurements, demodulated navigation data initially contained within the digital navigation signals in a modulated form, and orbital force models.

10 Claims, 1 Drawing Sheet

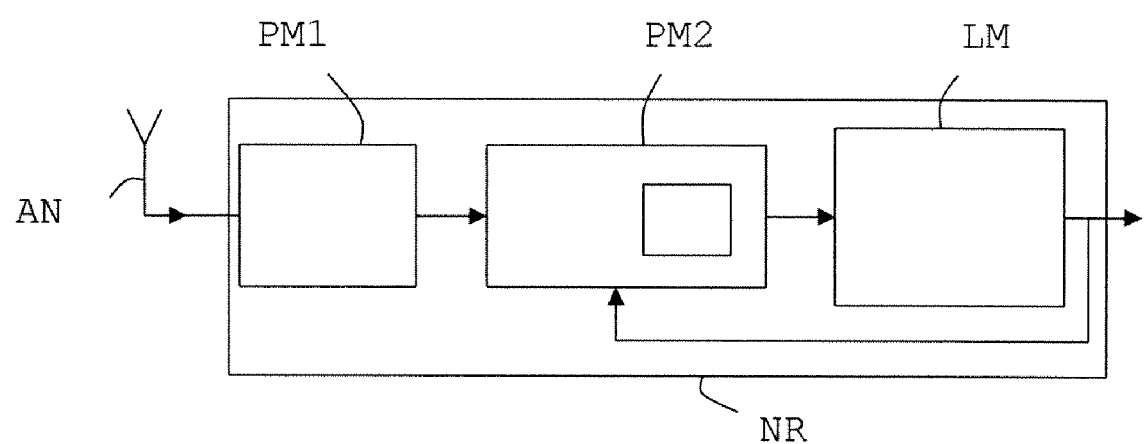

SPACE NAVIGATION RECEIVER OPERATING WITH THE ASSISTANCE OF NAVIGATION INFORMATION

The invention pertains to navigation receivers which are used in space applications, and which are fed with navigation radio signals by RNSS ("Radio Navigation Satellite System") and/or GNSS ("Global Navigation Satellite System") satellite navigation systems.

Here, "satellite navigation system" refers to any system dedicated to navigation and comprising: i) a constellation of (navigation) satellites placed in orbit around a celestial body (for example, the Earth) and tasked with broadcasting, to navigation receivers, radiofrequency (RF) navigation signals representative of navigation messages intended to enable them to determine their positions (the system may, for example, be an existing system (GPS, GLONASS) or a future system (GALILEO, COMPASS), or an equivalent or derivative thereof), or ii) a set of land-based radio emitters, tasked with emitting navigation signals to the zenith so that they may be picked by the navigation equipment (or receivers) installed on-board in spacecraft (such as satellites) that are to be positioned.

As is known to a person skilled in the art, the navigation receivers which are used in space applications are derived from those used in aeronautical applications. As a result, they have an architecture that relies on:
- a radiofrequency (RF) processing module, tasked with converting navigation radiofrequency signals transmitted by a satellite navigation system into digital signals,
- a digital processing module, tasked with producing raw measurements based on the navigation digital signals (particularly pseudo-distance measurements, integrated Doppler measurements, carrier phase measurements and C/No ratio measurements), and
- a location module (or "orbital navigator") tasked with determining, generally by means of an orbital Kalman filter, location points for the spacecraft (or space vehicle) in which it is installed, defined by a position, a velocity, a receiving (or local) time, and the deviation from the onboard clock, based on the raw measurements and navigation data demodulated by the digital processing module (initially contained within the digital navigation signals in a modulated form), as well as orbital force models.

Conventionally, the raw measurements and navigation data demodulated by the digital processing module are determined in two phases. A first phase known as the acquisition phase consists in running a time/frequency search by estimating the energy of the (digitized) signals received within a Doppler time segment for each code position of the CDMA signal. A second phase, known as the tracking phase, begins once the acquisition has been performed, i.e. once the navigation signals have been "picked up". It consists in tracking both the codes contained within the (digitized) signals received by means of a delay locked loop (or DLL) and the carrier frequency of the (digitized) signals received by means of a modified third-order Costas loop (for example), in order to periodically deliver the demodulated navigation data and raw measurements, typically every second, so that they may be used by the location module.

The purpose of the invention is to disclose a space navigation receiver whose energy consumption and/or mass is/are reduced.

To that end, it discloses a navigation receiver of the sort described in the introduction, but wherein:

the radiofrequency processing module is also configured in such a way as to convert auxiliary radio signals received, which are representative of navigation information regarding the system, into auxiliary digital signals, and
the digital processing module only periodically acquires the digital navigation signals (without tracking them) by sub-sampling the received signal, then processes the acquired (and therefore recorded) signal samples, with the processing being in either real-time or delayed mode, in order to deduce, from these samples, auxiliary digital signals, and location points, the navigation raw measurements which are then transmitted (in a sub-sampled fashion) to the location module (for example, a Kalman filter) so that it may produce the corresponding location points.

The inventive navigation receiver may comprise other characteristics, which may be taken separately or in combination, and particularly:
- it may be configured so as to receive the auxiliary radio signals which are useful for processing the navigation signals over a radio communication channel dedicated to telemetry/remote control (or "TM/RC").
- the navigation information, which is represented by the auxiliary radio signals, may, for example, be the ephemerides of the satellites of the satellite navigation system;
- its digital processing module may be tasked, during each acquisition period, with i) converting the digital navigation signals which are delivered by the radiofrequency module over a selected period of time into a set of samples, then ii) saving this set of samples, then iii) distinguishing the various digital navigation signals represented by the samples of the saved set, and deducing the raw measurements of these distinguished digital navigation signals, auxiliary digital signals and location points;
  - the selected period of time may, for example, be between about 10 milliseconds and about 40 milliseconds, and more preferentially between 10 milliseconds and 20 milliseconds;
- the acquisition period may, for example, be greater than or equal to 20 seconds, and preferentially at least equal to 30 seconds;
- the location module may be tasked with periodically determining location points, at an interval of time less than the acquisition period for the digital navigation signals;
  - the determination period may, for example, be equal to about one second.

Other characteristics and advantages of the invention shall become apparent upon examining the detailed description hereunder, and the attached drawing, in which the sole FIGURE very schematically depicts an example embodiment of a space navigation receiver according to the invention. The attached drawing may serve not only to complete the invention, but also may contribute to defining it, if need be.

The object of the invention is to enable the reduction of the energy consumption and/or mass of a space navigation receiver intended to be installed on board a spacecraft (or space vehicle).

In what follows, it is assumed by way of a non-limiting example that the (space navigation) receiver NR is installed on board a telecommunication observation satellite in geostationary or non-geostationary orbit, potentially flying in formation. However, the invention is not limited to this type of spacecraft (or space vehicle). Rather, it pertains to any type of spacecraft located on any type of trajectory (for example, in orbit around a body, such as for example the Earth, or on an interplanetary trajectory), and particularly interplanetary probes and space vehicles, whether or not they are manned (shuttles, rockets, and likewise).

Furthermore, it is assumed in what follows, by way of a non-limiting example, that the receiver NR is intended to provide location points for the spacecraft in which it is installed, based on signaling messages from a satellite navigation system (GNSS and/or RNSS), such as the GALILEO system. However, the invention is not limited to this type of satellite navigation system. Rather, it pertains to any system dedicated to navigation and comprising either a constellation of (navigation) satellites placed in orbit around a celestial body (for example, the Earth) and tasked with broadcasting, to navigation receivers, radiofrequency (RF) navigation signals representative of navigation messages intended to enable them to determine their locations, either a set of land-based radio emitters and tasked with emitting navigation signals towards the zenith so that they may be picked up by the navigation receivers NR and used to determine location points. It may therefore, for example, be an existing system (GPS, GLONASS) or a future system (COMPASS), or one of their equivalents or derivatives.

As is functionally depicted in the sole FIGURE, an inventive (space navigation) receiver NR comprises at least one antenna AN, a radiofrequency (RF) processing module PM1, a digital processing module PM2, and a location module LM.

The antenna(s) AN is (are) configured so as to receive radiofrequency signals, and particularly those which represent (navigation and integrity) messages about the (satellite navigation) system, in this case GALILEO.

The RF processing module PM1 is fed with RF signals by the antenna(s) AN. It is conventionally made up of at least one convertor tasked with preamplifying the RF signals received by an antenna AN, then filtering these pre-amplified (analog) signals, then converting the radiofrequency of the pre-amplified, filtered (analog) signals to an intermediary frequency, then converting the pre-amplified, filtered (analog) signals with the intermediary frequency into digital signals.

According to the invention, the receiver NR is the recipient of two types of messages regarding the (satellite) navigation system, in this case GNSS or RNSS.

The first type comprises navigation messages which are broadcast in the form of radio signals by satellites of the navigation system and/or by broadcast equipment associated therewith. Here, "navigation message" refers to a message comprising navigation information about the orbital position and/or synchronization (the difference between the internal clock and the system's reference clock) of a navigation satellite.

The second type comprises navigation information messages about the navigation system, which are broadcast in the form of radio signals, known as auxiliary signals, by broadcast equipment, which may, for example, belong to a system known as an "augmentation" or "assistance" system associated with the navigation system, and/or by the satellites thereof. Here, "navigation information" refers to at least the ephemerides of the navigation system's satellites.

The auxiliary radio signals are useful when processing the navigation signals and may, for example, be transmitted on a radio communication channel, known to a person skilled in the art by the acronym TM/RC, which is dedicated to telemetry performed by the spacecraft and the remote-controlling thereof.

The RF processing module PM1 is therefore configured in such a way as to both convert the radio navigation signals into navigation digital signals, and to convert the auxiliary radio signals (which represent the navigation information messages) into auxiliary digital signals.

The digital processing module PM2 is fed with digital navigation signals and auxiliary digital signals by the RF processing module PM1. It is first tasked with periodically acquiring the digital navigation signals, by subsampling the received signal. This acquisition consists in running a time/frequency search by estimating the energy of the digitized navigation signals within a Doppler time segment for each code position of the CDMA signal.

Preferentially, the digital processing module PM2 is periodically activated in such a way as to perform a very short acquisition during each so-called acquisition period. This period may, for example, be greater than or equal to 20 seconds, and preferentially at least equal to 30 seconds. For example, it may be 30 seconds or 90 seconds, if not more.

For example, during each acquisition period, the digital processing module PM2 begins by converting the digital navigation signals delivered by the RF processing module PM1 during a selected period of time into a set of samples. This period may, for example, be between about 10 milliseconds and about 40 milliseconds, but it may be greater than the values included within this interval (in particular, it may exceed 100 ms).

The digital processing module PM2 stores in a memory MY the samples of the set that is associated with the currently underway acquisition period, so that it preferentially may process them later and not on the fly (as it is not subject to heavy time constraints, due to the long period of time (the acquisition period) that exists between two successive processing operations of successive sample sets). This processing operation consists of distinguishing between the various digital navigation signals, which are represented by the samples of a set, saved in the memory MY. This distinguishing makes it possible to take measurements (particularly distance and Doppler measurements) of the navigation signals which are represented by the digital signals.

Once the digital processing module PM2 has distinguished between the various digital navigation signals, which are represented by a set of samples, it deduces raw measurements from them, from the auxiliary digital signals, and from one or more location points previously determined by the location module LM (which will be discussed later on). The raw measurements are produced by processing the sampled signals saved in the memory. The samples are processed in an open loop in acquisition mode without implementing tracking, code, or phase loops.

Here, "raw measurements" refers to any type of measurement that is conventionally useful for a location module LM to determine location points. Consequently, they particularly include pseudo-distance measurements (representative of the distance separating the spacecraft from the satellite of the satellite navigation system which emitted the received navigation signal), integrated Doppler measurements, navigation signal carrier phase measurements (represented by the demodulated navigation data) and C/No ratio measurements (the ratio of the power of the received signal to the power of the received noise).

The time needed by the digital processing module PM2 to determine the raw measurements, by processing a set of stored samples, is a function of the computing power available within the (micro)processor used; typically, this operation may be carried out using batch processing (i.e. as a lower-priority background task using the (micro)processor's residual computing power). Consequently, the digital processing module PM2 only needs to be activated for a very short fraction of each acquisition period so that it can save a set of samples and then process them.

It is important to note that the digital processing module PM2 may be successively activated twice during each acquisition period, the first (very short) time for saving the data samples (typically 20 ms to 100 ms), the second (longer) time for processing the samples (potentially in batches) and producing the raw measurements (typically several seconds, and in any event strictly less than the acquisition period).

The location module LM (generally called the "orbital navigator") is tasked with determining location points, for the spacecraft within which it is installed, based on the sub-sampled raw measurements (the last ones and the previous ones) and demodulated navigation data delivered by the digital processing module PM2. Here, "location point" refers to a point conventionally defined by a position (P), a velocity (V), a receiving or local time (T) and the deviation from the on-board clock. This determination of location points is carried out in Kalman filter extrapolation mode, typically periodically, at a rate of one point every second.

The location module LM may, for example, be of the same type as the one which equips the TOPSTAR 3000 navigation receiver made by the company ALCATEL. Such a location module LM may, for example, comprise an orbital Kalman filter that performs state vector propagation by means of an appropriate orbital force model and available navigation measurements. The state vector is made up of six orbital parameters, the value of the deviation from the local clock, and the local clock bias. In an application in the vicinity of Earth, the state vector propagation model may, for example, be based on a 40×40 Earth gravitational field model, the combined gravitational effects of the moon and the sun, and the effects of solar pressure.

As indicated above, due to Kalman filter extraction mode operation, the location module LM periodically delivers a location point. This period is preferentially much shorter than the acquisition period described above. Typically, it is chosen as equal to one second (though without being limited thereto).

This significant difference in the durations of the periods arises from the following observation. On account of the favorable dynamics experienced by a spacecraft during its space mission, the location module LM only actually needs raw measurements about the distances (pseudo-distances) every N seconds in order to determine and deliver, every M seconds, location points that correspond to the required trajectory accuracy for the mission in question. Thus M<<N; the respective values of M and N depend on the accuracy of the mission (for example M=1 s, and N=30 s or 90 s or 150 s). As a result, the digital processing module PM2 no longer needs to carry out a tracking phase subsequent to each acquisition phase, and the data obtained during each acquisition no longer needs to be processed on the fly.

The digital processing module PM2 and the location module LM of the inventive space navigation receiver NR are both preferentially created in the form of software (or computing) modules. However, they may also be constructed in the form of electronic circuits or a combination of circuits and software.

It should be noted that due to the simplified architecture of the navigation receiver NR, which no longer necessarily requires complex signal processing means, for example ASICs, the digital processing module PM2 and/or the location module LM may henceforth form part of the calculation means (the processor) of equipment installed on board the spacecraft, such as the calculation means of a spaceborne sensor or those of the attitude and orbit control system (or AOCS). Consequently, the modules that make up the space navigation receiver are not necessarily all combined within a single piece of on-board equipment, as in the example depicted in the sole FIGURE.

Furthermore, the invention makes it possible to combine multiple navigation functions by sharing common processor and memory resources. In this manner, a piece of equipment may be constructed that serves as both a star tracker and a satellite positioning system (or GPS), or as both an inertial sensor and a satellite positioning system (or GPS).

The invention is not limited to the embodiments of the space navigation receiver described above, which are given as an example, but rather encompasses all variants that a person skilled in the art may consider within the framework of the claims below.

The invention claimed is:

1. A space navigation receiver (NR), comprising i) a radiofrequency processing module (PM1) configured to convert radio navigation signals transmitted by a satellite navigation system into digital signals, ii) a digital processing module (PM2) configured to produce raw measurements based on said navigation digital signals, and iii) a location module (LM) configured to determine location points from said raw measurements, demodulated navigation data initially contained within said digital navigation signals in a modulated form, and orbital force models, wherein said radiofrequency processing module (PM1) is also configured to convert auxiliary radio signals representative of navigation information about said system into auxiliary digital signals, and said digital processing module (PM2) is configured to periodically acquire said digital navigation signals by sub-sampling the received radio signal, then processing the acquired signal's samples resulting from said sub-sampling so as to deduce said raw measurements from these samples, from said auxiliary digital signals, and from said location points.

2. The receiver according to claim 1, wherein the receiver is configured to receive said auxiliary radio signals that are useful for processing the navigation signals over a radio communication channel dedicated to telemetry/remote control (TM/RC).

3. The receiver according to claim 1, wherein said navigation information, represented by the auxiliary radio signals, are the ephemerides of the satellites of said satellite navigation system.

4. The receiver according to claim 1, wherein said digital processing module (PM2) is configured, during each acquisition period, to i) convert the digital navigation signals delivered by said radiofrequency processing module (PM1) during a selected period of time into a set of samples, then to ii) save said set of samples, then to iii) distinguish the various digital navigation signals represented by the samples of the stored set and deduce said raw measurements from these distinguished navigation signals, from said auxiliary digital signals, and from said location points.

5. The receiver according to claim 4, wherein said selected period of time is between about 10 milliseconds and about 40 milliseconds.

6. The receiver according to claim 5, wherein said selected period of time is between about 10 milliseconds and about 20 milliseconds.

7. The receiver according to claim 1, wherein said acquisition period is greater than or equal to 20 seconds.

8. The receiver according to claim 7, wherein said acquisition period is at least equal to 30 seconds.

9. The receiver according to claim 1, wherein said location module (LM) is configured to periodically determine location points, at an interval less than the acquisition period of said digital navigation signals.

10. The receiver according to claim 9, wherein said determination period is equal to about one second.

* * * * *